United States Patent [19]
Napier et al.

[11] Patent Number: 5,491,308
[45] Date of Patent: Feb. 13, 1996

[54] TURBINE INLET SILENCER

[75] Inventors: James C. Napier; Robert G. Thompson, both of San Diego, Calif.

[73] Assignee: Sundstrand Corporation, Rockford, Ill.

[21] Appl. No.: 866,142

[22] Filed: Apr. 9, 1992

Related U.S. Application Data

[62] Division of Ser. No. 719,651, Jun. 21, 1991, Pat. No. 5,140,819, which is a continuation of Ser. No. 414,115, Sep. 28, 1989, abandoned.

[51] Int. Cl.⁶ ........................................ E04F 17/04
[52] U.S. Cl. ............................. 181/224; 181/229
[58] Field of Search ........................... 181/213, 214, 181/217, 219, 222, 224, 229, 264, 292; 60/726; 415/119

[56] References Cited

U.S. PATENT DOCUMENTS

| | | | |
|---|---|---|---|
| 3,739,872 | 6/1973 | McNair | 181/224 |
| 3,841,434 | 10/1974 | Culpepper, Jr. | 181/224 |
| 4,266,602 | 5/1981 | White et al. | 181/224 |
| 4,276,954 | 7/1981 | Romano | 181/224 |
| 4,421,455 | 12/1983 | Tomren | 181/292 X |
| 4,723,626 | 2/1988 | Carr et al. | 181/213 |

*Primary Examiner*—Khanh Dang
*Attorney, Agent, or Firm*—Wood, Phillips, VanSanten, Clark & Mortimer

[57] ABSTRACT

In order to reduce noise transmission through the air inlet duct (16) of a turbine engine (10), the air inlet duct (16) provides a non-linear path defined by a bend (24) for air from a source, and the turbine engine (10) includes a sound attenuation assembly (26) in the form of a splitter dissipative silencer disposed near the bend (24) in the air inlet duct (16). More specifically, the turbine engine (10) is such that the splitter dissipative silencer (26) can be formed as a modular assembly (42) removably securable near the bend (24) in the air inlet duct (16) upstream of a radial compressor (12) for removal and/or replacement or availability as an optional component of the turbine engine (10).

5 Claims, 3 Drawing Sheets

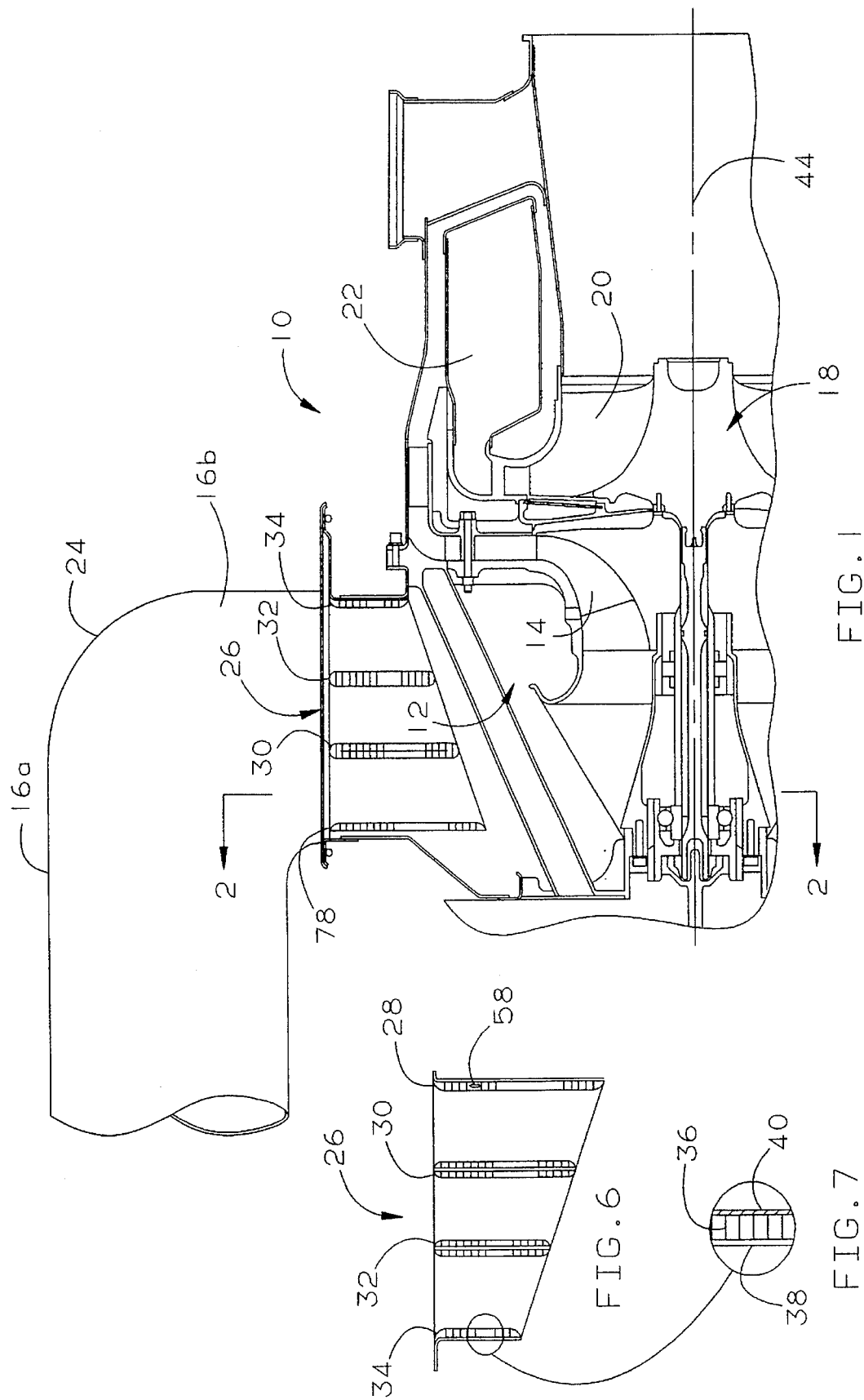

TURBINE INLET SILENCER

This is a division of application Ser. No. 07/719,651, filed Jun. 21, 1991, now U.S. Pat. No. 5,140,819, which is a continuation of application Ser. No. 07/414,115, filed Sep. 28, 1989, now abandoned.

FIELD OF THE INVENTION

The present invention is generally directed to turbine engines including auxiliary power units and, more particularly, to a sound attenuation assembly for reducing noise transmission through an air inlet duct thereof.

BACKGROUND OF THE INVENTION

Generally, it is well known that auxiliary power units of the turbine engine type produce a large amount of noise which is a direct result of the high velocities at which air or exhaust gases are moving through the various stages thereof and the interaction of these components with inlet air and exhaust gases. For instance, the noise emissions from gas turbine auxiliary power units are particularly troublesome in aircraft or other installations where personnel are required to be in close proximity while the auxiliary power unit is in operation. At such times, noise levels can exceed values consistent with International Civil Aviation Organization (ICAO) Guidelines for civil aircraft, Occupational Safety and Health Administration (OSHA) Regulations for human safety, and military specifications.

For these reasons, it is most desirable to be able to maintain safe noise levels in and around auxiliary power units to avoid hearing damage where continued human exposure is required. Unfortunately, there have been no truly practical means of modifying auxiliary power unit turbine design without penalties to performance, particularly in cases where efforts have been made to effect a reduction of noise transmission through the air inlet duct of the turbine. In other words, there has remained a need to reduce such noise, including high frequency noise above 4,000 Hz, of the type which is generated by passage of air through the blades in the compressor stage.

Among the efforts to provide noise reduction is that disclosed in Smith et al. U.S. Pat. No. 3,715,009, issued Feb. 6, 1973. Smith et al. is specifically directed to a noise suppression system for testing jet engines which includes both an intake silencer and an exhaust noise suppressor, but the intake silencer is simply a portable acoustical absorptive chamber whose walls are formed to have acoustic characteristics capable of absorbing objectionable high frequencies in intake-generated sound during jet engine testing operations. Clearly, Smith et al. would not be suitable for use during normal operation for attenuating high frequency noise of compressor blades at an inlet duct.

An attempt to eliminate vortex whistle by utilization of a pair of tabs in an intake assembly of a load compressor is disclosed in Linder U.S. Pat. No. 4,531,356, issued Jul. 30, 1985. These vortex disturbing tabs or baffle members are arranged relative to a series of adjustable inlet guide vanes associated with a circular radially outwardly facing inlet opening. However, Linder fails to disclose or suggest a mechanically simplified modular sound attenuation assembly for reducing high frequency noise caused by air passage through compressor blades.

Among other attempts to provide a sound attenuation assembly, or to provide noise suppression of one form or another, are those disclosed in U.S. Pat. Nos. 3,739,872; 3,620,329; and 3,011,584.

The present invention is directed to overcoming the above stated problems and accomplishing the resulting objects.

SUMMARY OF THE INVENTION

It is the principal object of the present invention to provide a new and improved sound attenuation assembly. More specifically, it is an object of the present invention to provide a splitter dissipative silencer for use in a turbine engine. It is likewise an object of the invention to provide a modular sound reducer for an auxiliary power unit.

An exemplary embodiment of the invention achieves the foregoing objects in a turbine engine, preferably an auxiliary power unit, having a radial compressor with a plurality of compressor blades in communication with an air inlet duct. A turbine wheel having a plurality of turbine blades is coupled to the radial compressor for driven movement thereof. An annular combustor in communication with the compressor and the turbine wheel is disposed about the turbine wheel. With this arrangement, the annular combustor is adapted to receive and combust fuel from a source with air from the compressor to generate gases of combustion which are directed at the turbine blades for driven movement of the turbine wheel.

In addition, the air inlet duct is formed such that it includes a bend defining a non-linear path for air flowing through it from a source. The turbine engine or auxiliary power unit also suitably includes means for reducing noise transmission from the radial compressor through the air inlet duct. In a preferred embodiment, the noise transmission reducing means comprises a splitter dissipative silencer disposed near the bend in the air inlet duct.

In a highly preferred embodiment, the splitter dissipative silencer includes a plurality of baffles disposed so as to be in generally parallel relationship. The baffles advantageously each include an aluminum alloy honeycomb core together with a sheet aluminum back plate and a porous acoustic media baffle plate, and the silencer is advantageously disposed by a distance not greater than two air inlet duct diameters of the bend in the air inlet duct. In addition, the noise transmission reducing means preferably is a modular assembly removably securable near the bend in the air inlet duct upstream of the radial compressor.

As for the air inlet duct, it preferably includes a first non-linear path portion extending in a direction generally parallel to an axis of the radial compressor and a second non-linear path portion extending in a direction generally radially of an axis of the radial compressor. The non-linear path is therefore defined by a generally radially extending air inlet duct portion and a generally axially extending air inlet duct portion. As a result of this geometrical arrangement of the air inlet duct, the sound attenuation assembly is most advantageously disposed in the generally radially extending air inlet duct portion between the bend and the radial compressor.

In addition, the present invention is directed to a sound attenuation assembly for an auxiliary power unit having an air inlet duct leading to a radial compressor. The assembly comprises a frame including a pair of spaced apart end plates. The end plates have a plurality of baffles extending therebetween. Each of the baffles has sound attenuation means associated therewith. The baffles are disposed in parallel, spaced apart relation. The assembly also includes means for removably securing the frame within the air inlet duct. More specifically, the frame is securable at an angle to the direction of flow of air through the air inlet duct from a source.

In a preferred embodiment, the removable securing means is a flange for mounting the frame within the radially extending portion of the air inlet duct between the bend and the radial compressor. The flange is positionable such that the baffles are disposed by a distance not greater than two air inlet duct diameters from the bend. Still more specifically, the baffles each extend generally perpendicular to an axis of the radial compressor and to the direction of flow of air from the source.

Still other objects, advantages and features of the present invention will become apparent from a consideration of the following specification taken in conjunction with the accompanying drawings.

BRIEF DESCRIPTION OF THE DRAWINGS

FIG. 1 is a partially schematic cross sectional view of an auxiliary power unit turbine engine in accordance with the present invention;

FIG. 6 is a cross sectional view of the sound attenuation assembly as illustrated in FIG. 4 showing the internal construction thereof; and FIG. 7 is a detail view of a portion of an end baffle of the assembly of FIG. 6.

DETAILED DESCRIPTION OF THE PREFERRED EMBODIMENT

Figure 3:
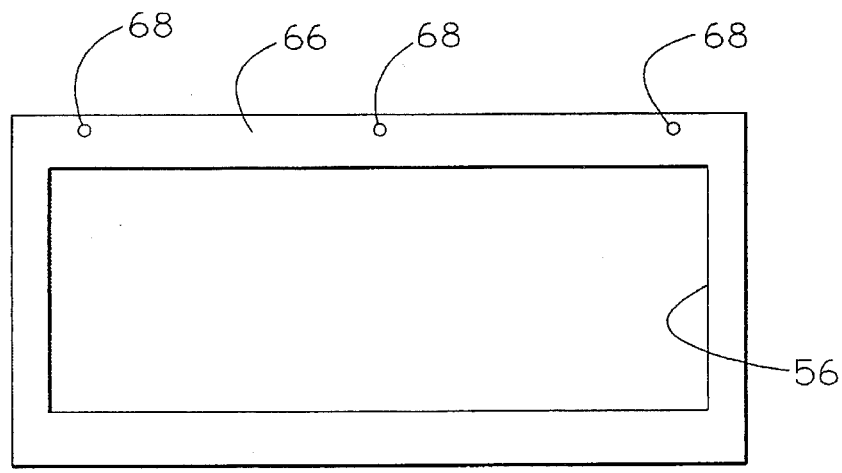
FIG. 3 is a top plan view of the auxiliary power unit turbine engine as illustrated in FIG. 2 with the sound attenuation assembly removed.

Referring to the drawings, and first to FIG. 1, the reference numeral 10 designates generally an auxiliary power unit turbine engine. The engine 10 includes a radial compressor 12 having a plurality of compressor blades 14 in communication with an air inlet duct 16. A turbine wheel 18 having a plurality of turbine blades 20 is coupled to the radial compressor 12 for driven movement thereof. An annular combustor 22 disposed about the turbine wheel 18 is in communication with the compressor 12 and the turbine wheel 18. With this arrangement, the annular combustor 22 is adapted to receive and combust fuel from a source with air from the compressor 12 to generate gases of combustion to be directed at the turbine blades 20 for driven movement of the turbine wheel 18.

As shown in FIG. 1, the air inlet duct 16 includes a bend as at 24 defining a non-linear path for air from a source in the direction of the arrow. It will also be seen that the engine 10 includes means for reducing noise transmission from the radial compressor 12 through the air inlet duct 16 in the form of a sound attenuation assembly 26 which may comprise a splitter dissipative silencer disposed near the bend 24 in the air inlet duct 16. As shown, the splitter dissipative silencer 26 includes a plurality of baffles 28, 30, 32 and 34 disposed in generally parallel relationship.

As will be appreciated by referred to FIGS. 6 and 7, the baffles 28, 30, 32 and 34 each include an aluminum alloy honeycomb core 36 together with a sheet aluminum back plate 38 and a baffle plate 40 formed of a porous acoustic media such as the material sold under the trademark Feltmetal by Brunswick Corporation. It will also be appreciated by again referring to FIG. 1, and it has been found in practice, that it is highly advantageous for the splitter dissipative silencer 26 to be disposed by a distance not greater than two air inlet duct diameters of the bend 24 in the air inlet duct 16. Further, as will be appreciated by referring to FIGS. 4 and 5, the splitter dissipative silencer 26 is a portion of a modular assembly generally designated 42 which is removably securable near the bend 24 in the air inlet duct 16 upstream of the radial compressor 12.

Referring to FIG. 1, the air inlet duct 16 includes a first non-linear path portion 16a extending in a direction generally parallel to an axis 44 of the radial compressor 12 and a second non-linear path portion 16b extending in a direction generally radially of the axis 44 of the radial compressor 12. The non-linear path is therefore defined by the generally axially extending air inlet duct portion 16a and the generally radially extending air inlet duct portion 16b. As will be appreciated by referring to FIGS. 1, 2 and 3, the sound attenuation assembly or silencer 26 is disposed in the generally radially extending air inlet duct portion 16b between the bend 24 and the radial compressor 12 for reducing high frequency noise.

More specifically, the sound attenuation assembly is located to significantly reduce high frequency noise caused by air passing through the compressor blades 14 which might otherwise be transmitted upstream through the air inlet duct 16.

Referring specifically to FIGS. 4 through 7, it will be appreciated that the invention is directed to the unique modular sound attenuation assembly 42 for the auxiliary power unit 10 in combination with the air inlet duct 16 leading to the radial compressor 12. The modular assembly 42 includes a frame generally designated 46 having a pair of spaced apart end plates 48 and 50. The end plates 48 and 50 have a plurality of baffles 28, 30, 32 and 34 extending therebetween. The baffles 28, 30, 32 and 34 each have sound attenuation means associated therewith. The sound attenuation means is preferably in the form of the unique structure previously described in connection with FIG. 7. The baffles 28, 30, 32 and 34 are disposed in parallel, spaced apart relation. In addition, the sound attenuation assembly 42 includes means for removably securing the frame 46 within the air inlet duct 16 at an angle to the direction of flow of air through the air inlet duct 16 from the source.

More specifically, the removable securing means comprises a flange 52 for mounting the frame 46 within the radially extending portion 16b of the air inlet duct 16 between the bend 24 and the radial compressor 12. The baffles 28, 30, 32 and 34, as previously mentioned, are preferably disposed by a distance not greater than two air inlet duct diameters from the bend 24 in the air inlet duct 16. When so formed, the baffles 28, 30, 32 and 34 may each extend generally perpendicular to the axis 44 of the radial compressor 12 and to the direction of flow of air through the axially extending portion 16a of the air inlet duct 16 from the source.

Figure 2:
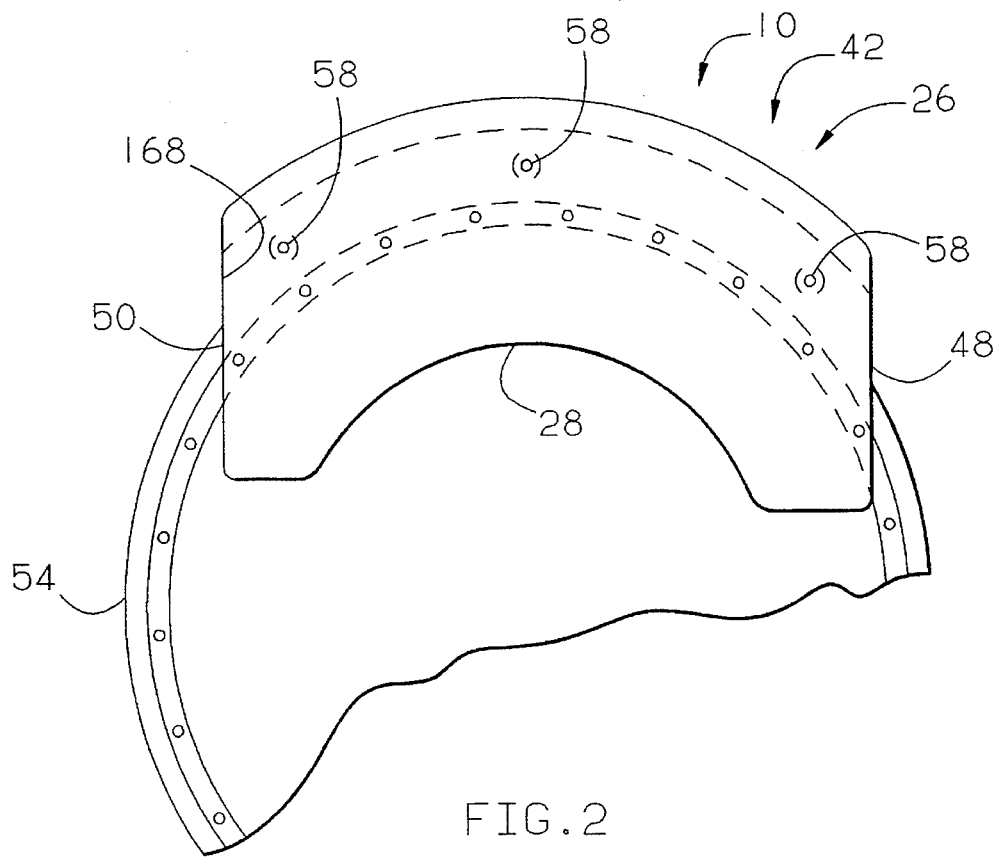
FIG. 2 is a cross sectional view taken on the line 2—2 of FIG. 1 with internal components removed to show the location for a sound attenuation assembly.

Referring to FIGS. 2 and 3, the exact location of the sound attenuation assembly 42 can be more fully appreciated. It will be seen that the engine 10 includes a housing 54 having an air inlet duct connecting opening 56, and the radially extending portion 16b of the air inlet duct 16 is adapted to be secured about the opening 56 as is the modular sound attenuation assembly 42. In this manner, the modular sound attenuation assembly 42 can readily be removed from and/or replaced in the turbine engine 10.

Figure 5:
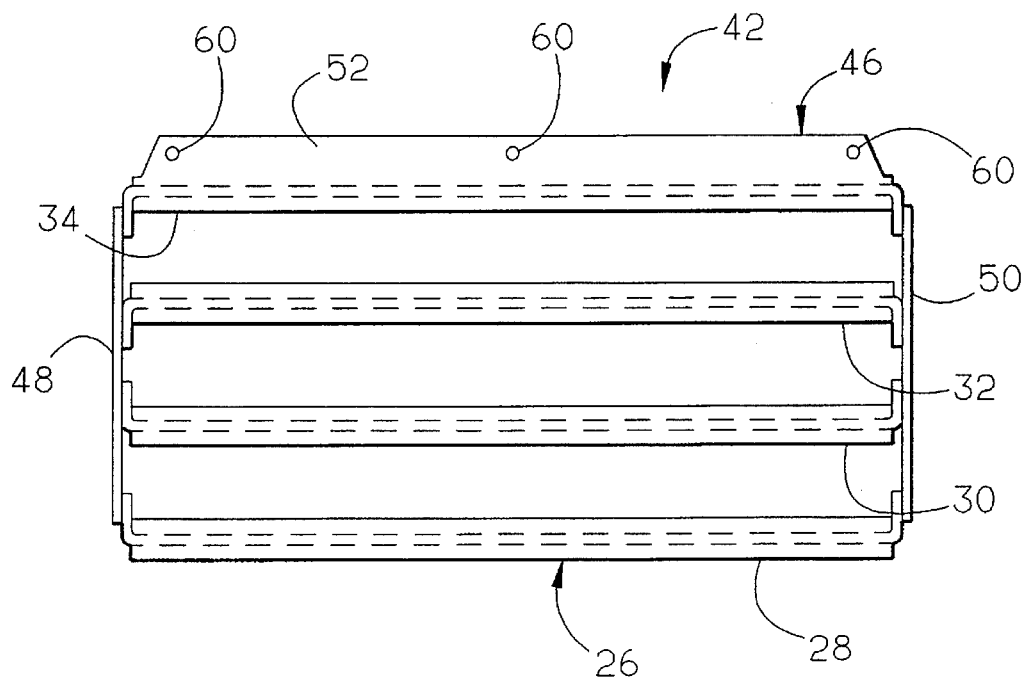
FIG. 5 is a top plan view of the sound attenuation assembly as illustrated in FIG. 4 showing the modular nature thereof.
Figure 4:
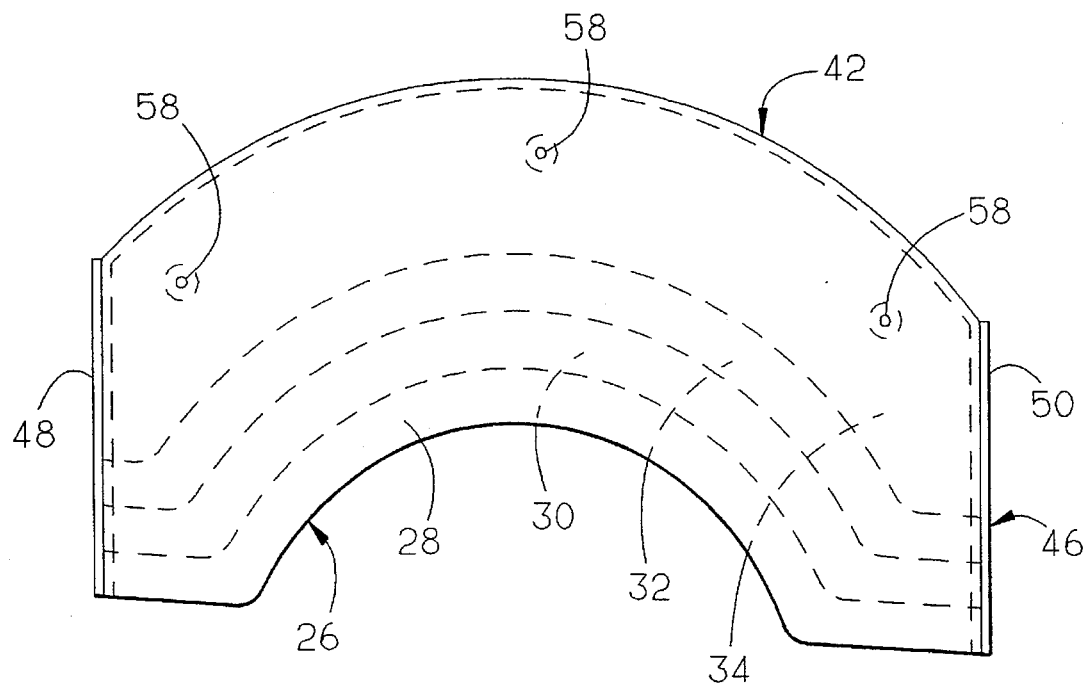
FIG. 4 is a front elevational view of a sound attenuation assembly in accordance with the present invention.

In this connection, it will be appreciated from FIGS. 4 through 6 that the baffle 28 has a plurality of mounting holes 58 therein and the mounting flange 52 has a plurality of mounting holes 60 therein. Thus, the modular sound attenuation assembly 42 can readily be fastened to a rear wall of the engine by means of suitable fasteners by utilizing holes therein which mate with holes 58 and likewise the mounting flange 52 can be secured to a collar 66 surrounding the opening 56 by utilizing holes 68 which mate with holes 60 for utilization of suitable fasteners. Because of these unique features as described, the modular sound attenuation assembly 42 can be removed for cleaning or repair and/or replaced or used as an optional component depending upon the requirements for a given application.

By comparing FIGS. 1, 4 and 6, it will be seen that the various baffles 28, 30, 32 and 34 are of differing vertical heights. This is merely due to the structural characteristics of the radial compressor stage 12 static assembly. In addition, the construction of the end baffles 28 and 34 differs from the intermediate baffles 30 and 32.

As shown in FIG. 7, the end baffles 28 and 34 simply include a sheet aluminum back plate 38 and a porous acoustic media baffle plate 40 on opposite sides of an aluminum alloy honeycomb core 36. This is because the sheet aluminum back plate 38 abuts a wall within the opening 56 and there is, thus, no reason to have the double oppositely facing construction of the intermediate baffles 30 and 32. In other words, the composite construction of the baffles as illustrated in FIG. 7 need only face toward regions of passage of high frequency noise in the direction of the air inlet duct 16.

Referring to FIG. 6, the ends of the baffles 28, 30, 32 and 34 facing the radial compressor 12 are preferably angled so as to be disposed at an oblique angle to the path of travel of noise. It will be noted that the opposite ends of the baffles 28, 30, 32 and 34 are rounded for aerodynamic reasons. With this construction, the modular sound attenuation assembly 42 has highly advantageous sound absorption characteristics for high frequency noise.

As should now be appreciated, the present invention provides a unique inlet silencer scheme for inlet noise in auxiliary power unit turbine engines. It has enhanced performance by virtue of its geometry that reduces high frequency noise transmission through the air inlet duct. As will be appreciated, this occurs in part because of the angle, preferably near 90 degrees, of the air inlet duct to the silencer sound absorbing elements.

In practice, it has been found that high frequency noise above 4,000 Hz is generated by the compressor stage of the auxiliary power unit turbine engine. The most significant level of noise is in a very narrow band generated by air passage through the compressor blades. Since directionality is a characteristic of high frequency noise, the silencer design uses a splitter concept where the splitter silencer is nearly orthogonal to the noise exit path.

As a result, the high frequency noise will necessarily react with the silencer elements before exiting which greatly enhances acoustic attenuation. Furthermore, because of the modular nature of the assembly, it can be removed for cleaning, replaced while in service, or provided as an option.

While in the foregoing there has been set forth a preferred embodiment of the invention, it will be appreciated that the details herein given may be varied by those skilled in the art without departing from the true spirit and scope of the appended claims.

We claim:

1. A modular sound attenuation assembly for an auxiliary power unit having an air inlet duct leading to a radial compressor, comprising:

a frame including a pair of spaced apart end plates;

a plurality of baffles extending between said end plates, each of said baffles having sound attenuation means associated therewith, said baffles being disposed in parallel, spaced apart relation; and means for removably securing said sound attenuation assembly to said auxiliary power unit by securing said frame within said air inlet duct, said sound attenuation assembly being removably secured such that said baffles are positioned generally perpendicular to the direction of flow of air through said air inlet duct from a source, said baffles each extending generally perpendicular to an axis of said radial compressor.

2. The sound attenuation assembly as defined in claim 1 wherein said air inlet duct has a generally radially extending portion and a generally axially extending portion defining a bend therebetween.

3. The sound attenuation assembly as defined in claim 2 wherein said removable securing means is a flange for mounting said frame within said radially extending portion between said bend and said radial compressor.

4. The sound attenuation assembly as defined in claim 3 wherein said baffles are disposed by a distance not greater than two air inlet duct diameters from said bend in said air inlet duct.

5. The sound attenuation assembly as defined in claim 1 wherein said baffles each include an aluminum alloy honeycomb core together with a sheet aluminum back plate and a porous acoustic media baffle plate.

* * * * *